United States Patent [19]

Nathenson et al.

[11] Patent Number: 4,802,531

[45] Date of Patent: Feb. 7, 1989

[54] PUMP/INTERMEDIATE HEAT EXCHANGER ASSEMBLY FOR A LIQUID METAL REACTOR

[75] Inventors: Richard D. Nathenson, Pittsburgh; Christopher C. Alexion; Wayne C. Sumpman, both of N. Huntingdon, all of Pa.

[73] Assignee: Electric Power Research Institute, Palo Alto, Calif.

[21] Appl. No.: 875,151

[22] Filed: Jun. 17, 1986

[51] Int. Cl.$^4$ ............................................. H02K 44/02
[52] U.S. Cl. .......................... 165/104.28; 165/104.23; 417/50
[58] Field of Search ....................... 165/104.28, 104.23, 165/120; 417/50

[56] References Cited

U.S. PATENT DOCUMENTS

| | | |
|---|---|---|
| 2,655,107 | 10/1953 | Godbold . |
| 3,005,313 | 10/1961 | Carlson, Jr. . |
| 3,034,002 | 5/1962 | Carlson, Jr. . |
| 3,115,837 | 12/1963 | Campana . |
| 3,179,824 | 4/1965 | Stuetzer . |
| 3,214,615 | 10/1965 | Way . |
| 3,216,182 | 11/1965 | Cochran et al. . |
| 3,248,578 | 4/1966 | Brill et al. . |
| 3,280,349 | 10/1966 | Brenner et al. . |
| 3,432,694 | 3/1969 | Bidard . |
| 3,567,339 | 3/1971 | Paine . |
| 4,294,658 | 10/1981 | Humphreys et al. ........... 165/104.28 |

FOREIGN PATENT DOCUMENTS

| | | |
|---|---|---|
| 0061120 | 9/1982 | European Pat. Off. . |
| 2293101 | 6/1976 | France . |
| 745460 | 2/1956 | United Kingdom . |
| 905940 | 9/1962 | United Kingdom . |
| 2033644B | 9/1982 | United Kingdom . |
| 2115616 | 9/1983 | United Kingdom . |

OTHER PUBLICATIONS

"Sodium Electrotechnology at the Risley Nuclear Power Development Laboratories," by Davidson et al., *Nucl. Energy*, 1981, vol. 20, Feb., No. 1, 79–90.

EPRI "A Proposed Concept For Economical Breeder Planks" by R. K. Winkleblack, Dec. 19, 1980.

EPRI, "High-Efficiency DC Electromagnetic Pumps and Flow Couplers for LMFBRs" by I. R. McNab and C. C. Alexion, Jan., 1981.

"Demonstration of a Flow Coupler for the LMFBR" by R. D. Nathenson, C. C. Alexion, A. R. Keeton, and O. E. Gray, III, Mar. 5, 1984.

*Primary Examiner*—Albert W. Davis, Jr.

[57] ABSTRACT

A heat exchanger and electromagnetic pump assembly is disclosed as comprising a heat exchanger including a housing for defining an annularly shaped cavity and supporting therein a plurality of tubes. An electromagnetic pump is disposed beneath the heat exchanger and is comprised of a plurality of flow couplers disposed in a circular array. Each flow coupler is comprised of a pump duct for receiving primary liquid metal, and a generator duct for receiving an intermediate liquid metal. A downcomer tube is disposed centrally of the assembly and passes through the annularly shaped cavity and the array of flow couplers to discharge the intermediate fluid into a first plenum chamber. The first plenum chamber is disposed in communication with the generator ducts of all of the flow couplers, thus permitting the intermediate liquid metal to flow upward therethrough. The generator ducts exit their flows of the intermediate liquid metal in common to a second plenum chamber, which is disposed in communication with the annularly shaped cavity to permit the flow of the intermediate liquid metal therethrough, whereby the intermediate liquid metal is heated by the flow of the primary liquid metal through the tubes. A third plenum chamber receives collectively the flows of the primary liquid metals from the tube and for directing the primary liquid metal to the pump ducts of the flow couplers, whereby a force is exerted on the primary liquid metal, pumping it through the pump ducts.

15 Claims, 7 Drawing Sheets

PUMP/INTERMEDIATE HEAT EXCHANGER ASSEMBLY FOR A LIQUID METAL REACTOR

BACKGROUND OF THE INVENTION

Field of the Invention

This invention relates to electromagnetic pumps known as flow couplers employed for pumping electrically conducting fluids such as liquid metals, and more particularly to such pumps as employed in liquid metal reactors, wherein the internal energy of a first flow of the liquid metal, e.g. intermediate sodium flow, is transferred by such flow couplers to a second flow of a liquid metal, e.g. the primary sodium flow. Further, it is contemplated that such flow couplers may be incorporated into assemblies including heat exchangers for transmitting the relatively high thermal energy of the second flow to the first flow.

Reference to Co-pending Applications

Reference is made to the following co-pending, commonly assigned patent application U.S. Ser. No. 822,183, entitled "Electromagnetic Flow Coupler for Regulating Flow Rate/Pressure," filed Jan. 24, 1986 in the names of C. C. Alexion et al.

Description of the Prior Art

Early in the development of the liquid-metal fast breeder or nuclear reactor (LMFBR), it was recognized that liquid metals could be pumped by electromagnetic (EM) pumps. Such EM pumps offer the advantages of inherent simplicity and the lack of moving parts as compared with conventional, rotating impeller pumps. Such mechanical pumps have inherent problems associated with vibration or thermal distortion in areas of closely toleranced moving parts, such as bearings or seals. Furthermore, cavitation problems associated with a rotating impeller do not exist in an EM pump.

One such EM pump, known as a flow coupler, is particularly adapted to pump the primary flow of liquid metal to be heated by a core of the nuclear reactor. Such flow couplers transfer the internal energy of an intermediate flow of liquid metal to the primary flow, driving or pumping the primary flow.

Early examples of such flow couplers are described in U.S. Pat. No. 2,715,190 of Brill and UK Pat. No. 745,460 of Pulley. In a typical flow coupler, a driven liquid metal in the intermediate flow is directed through a generator duct of the flow coupler. Adjacent to the generator duct is a pump duct, through which flows the primary flow. The intermediate and primary flows of liquid metal within the generator and pump ducts are exposed to a common magnetic field. Passage of the first flow through the common magnetic field generates a relatively low voltage, which produces a large current in the generator duct, which is applied to the pump duct by a short, low resistance electrode disposed between the generator and pump ducts and by return conductors disposed on either side of the ducts. Interaction of the resulting high current in the pump duct with the common magnetic field drives the primary flow in the pump duct. In this manner, the intermediate flow of the liquid metal in the generator duct is "coupled" to the primary flow of the liquid metal in the pump duct. The use of such flow couplers in LMFBR systems is described in "Sodium Electrotechnology at the Risley Nuclear Power Development Laboratories", by D. F. Davidson et al., NUCLEAR ENERGY, 1981, Volume 20, February, No. 1, pp. 79–90. U.S. Pat. No. 4,469,471 of A. R. Keeton, et al. describes an improved embodiment of such a flow coupler.

In U.S. Pat. No. 4,412,785 of W. G. Roman, there is described a flow coupler/heat exchanger assembly for use with a nuclear reactor. The assembly forms an annular region between inner and outer shells. A plurality of tube sets is disposed within the annular region, with relatively large spaces between adjacent tube sets. A magnetic field is established in a radial direction through the annular region. A first conductive fluid, e.g. the intermediate liquid metal, is pumped through the spaces between the tube sets by an enlarged intermediate pump. A second conductive fluid, e.g. the primary liquid metal, is introduced into the tube sets. The radial magnetic flux couples the flow of intermediate liquid metal with the flow of primary liquid metal. The externally pumped flow of the intermediate liquid metal in the spaces between the tube sets through the radial magnetic flux, produces a voltage and a current in a circumferential direction about the annular region. The current passes through the adjacent tubes and the primary liquid metal therein, producing a driving force in the opposite direction, whereby the primary liquid metal is driven or pumped.

In a publication entitled, "High-Efficiency DC Electromagnetic Pumps and Flow Couplers For LMFBRs," EPRI NP-1656, TPS 79-774, Final Report, January 1981, by I. R. McNab and C. C. Alexion, there is described an integral assembly of a heat exchanger and a flow coupler for a pool-type, LMFBR. A plurality of duct modules is disposed in a circle, with a magnetic field coil disposed between adjacent duct modules. Each duct module includes a pump duct through which the primary liquid metal flows and a generator duct through which the intermediate liquid metal flows in an opposite direction. The magnetic flux generated by the magnetic field coil is directed by an iron circuit to form a circular magnetic field through all of the duct modules. In one embodiment, the intermediate liquid metal is introduced into a centrally disposed inlet and directed downwardly to be introduced to an intermediate heat exchanger comprised of a plurality of vertically oriented tubes. The intermediate liquid metal is then directed upward and about these tubes, before being introduced into each of the generator ducts. The primary flow of liquid metal is directed downwardly through the pump ducts, exiting the pump ducts and being introduced into the tubes of the intermediate heat exchanger, flowing downwardly therethrough, before being discharged and recirculated to the nuclear core. It is contemplated that the flow coupler may be located beneath such an intermediate heat exchanger. In the described embodiment, both of the intermediate and primary flows of liquid metal through the flow coupler, are disposed at the relatively high temperature as appears at the outlet of the nuclear core, e.g. in the range of 900° to 1,000° F. If the temperature of the liquid metal flows could be reduced, the electrical efficiency of the flow coupler could be improved. Further, the mechanical design requirements of a flow coupler operating at reduced temperatures would be less demanding. Further, both of the upper, discharge ends of the vertically oriented tubes of the intermediate heat exchanger and of the lower, input ends of the generator ducts of the flow coupler, are supported by but a single tube sheet or support plate. As a result, the generator ducts displace a number of the intermediate heat exchanger tubes, that would otherwise be supported by the single support plate, thus requiring an assembly of greater diameter or dimension to accommodate a given number of tubes, as require to receive a predetermined flow of the intermediate liquid metal therethrough. It is desired for the greatest efficiency of heat transfer between the intermediate and primary flows of liquid metal, to increase the flow of the intermediate liquid metal, while maintaining or reducing the size of the integral assembly of the heat exchanger and flow coupler.

SUMMARY OF THE INVENTION

It is an object of this invention to provide a new and improved pump and heat exchanger as particularly adapted to be incorporated into a LMFBR.

It is a still further object of this invention to provide a pump and heat exchanger assembly of compact design and configuration so as to minimize the cost of materials and to withstand internal fluid pressures and external, seismic forces.

It is a more particular object of this invention to provide a new and improved array of flow couplers adapted to improve the generation and direction of the magnetic field through the pump and generator ducts thereof, while isolating the current paths within each of the flow coupler units (or duct modules) from each other.

It is a further object of this invention to provide a new and improved integral pump and heat exchanger assembly of compact design, wherein the number of heat exchanger tubes is increased for a given dimension of the assembly, while facilitating the flows of the intermediate liquid metal from the heat exchanger to the pump ducts of the flow coupler, and from the generator ducts to the tubes of the intermediate heat exchanger.

In accordance with these and other objects of this invention, there is provided a heat exchanger and electromagnetic pump assembly comprising a heat exchanger including a housing for defining an annularly shaped cavity and supporting therein a plurality of tubes. An electromagnetic pump is disposed beneath the heat exchanger and is comprised of a pluraltiy of flow couplers disposed in a circular array. Each flow coupler is comprised of a pump duct for receiving a first electrically conductive liquid, i.e. the primary liquid metal, and a generator duct for receiving a second electrically conductive fluid, i.e. the intermediate liquid metal. A conduit in the form of a downcomer tube, is disposed centrally of the assembly and passes through the annularly shaped cavity and the array of flow couplers to discharge the intermediate fluid into a first plenum chamber. The first plenum chamber is disposed in communication with the generator ducts of all of the flow couplers, thus permitting the intermediate liquid metal to flow upward therethrough. The generator ducts discharge their flows of the intermediate liquid metal in common to a second plenum chamber disposed between the heat exchanger and the electromagnetic pump. In turn, the second plenum is in communication with the annularly shaped cavity to permit the flow of the intermediate liquid metal therethrough, whereby the intermediate liquid metal is heated by the flow of the primary liquid metal through the tubes. There is further included a third plenum chamber for receiving collectively the flows of the primary liquid metals from the tube and for directing the primary liquid metal to the pump ducts of the flow couplers, whereby a force is exerted on the primary liquid metal, pumping it through the pump ducts.

In a further aspect of this invention, it is contemplated that more than one flow coupler may be assembled together in an efficient configuration. The pump and generator ducts are interposed between each other to reduce the generation of end currents.

In a still further aspect of this invention, a flow coupler comprises a generator duct and a pump duct disposed adjacent each other, each duct comprising opposing side portions and opposing end portions. The pump and generator ducts are disposed so that one end portion of the generator duct lies adjacent an end portion of the pump duct. A laminate structure is disposed about this assembly of the pump duct and the generator duct, and comprises first and second plates interleaved with each other. The first plate is made of a highly electrically conductive material to provide an efficient return path therethrough for the currents generated within the ducts. The second plate is made of a magnetic material to provide an efficient path for the magnetic field to flow through the pump and generator ducts. Insulating means is disposed along the side portions of the pump and generator ducts to electrically isolate the current path through the ducts from the return current paths formed by the first plate(s).

BRIEF DESCRIPTION OF THE DRAWINGS

The advantages, nature and additional features of the invention will become more apparent from the following descripion, taken in connection with the accompanying drawings, in which.

DESCRIPTION OF THE PREFERRED EMBODIMENTS

Figure 1:
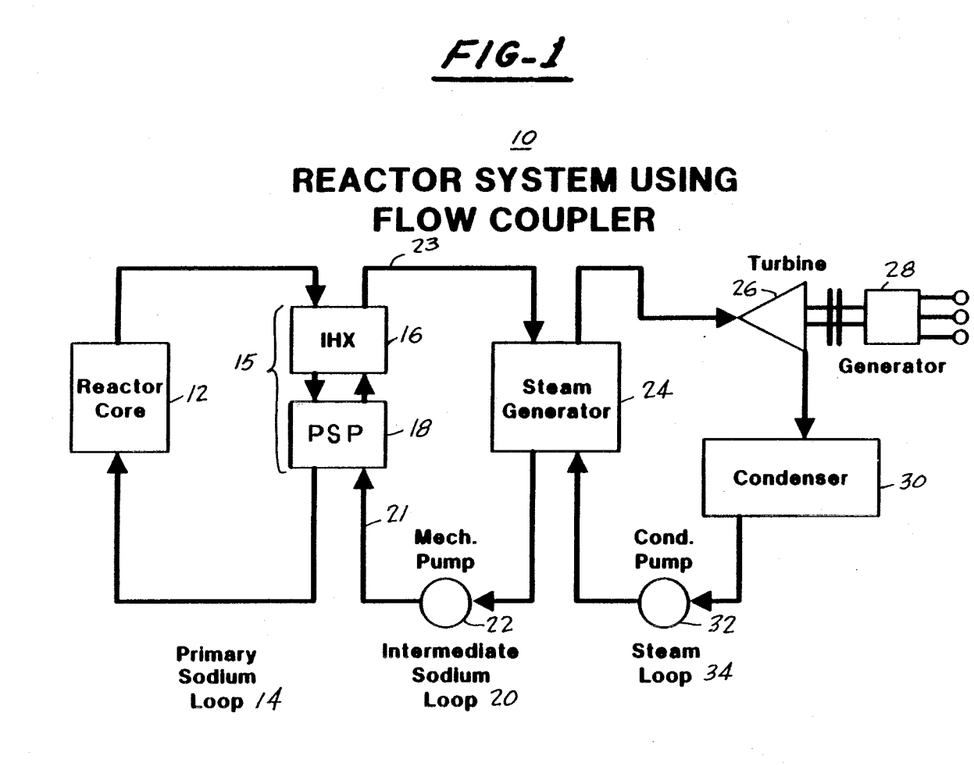
FIG. 1 is a simplified schematic of a nuclear liquid metal reactor system incorporating an assembly of a primary sodium pump (PSP) and heat exchanger in accordance with the teachings of this invention.

Referring now to the drawings and in particular to FIG. 1, there is shown a reactor system 10 including an assembly 15 of an intermediate heat exchanger (IHX) 16 and a flow coupler or primary sodium pump (PSP) 18. The IHX 16 and the PSP 18 are coupled in circuit with a primary loop or flow 14 of an electrically conductive fluid, such as sodium, and an intermediate loop or flow 20 of an electrically conductive fluid, e.g. sodium. As will be explained, the PSP 18 pumps the liquid metal about the primary loop 14 to and from a reactor core 12, where the primary fluid is heated to relatively high temperatures on the order of 500° C.

The IHX 16 transfers thermal energy from the heated primary liquid metal to the intermediate liquid metal. In the intermediate loop 20, a mechanical pump 22 pumps the intermediate liquid metal through an inlet conduit 21 to the PSP 18 in the form of a flow coupler, which as will be explained in detail below transfers the internal energy from the driven intermediate liquid metal to the primary liquid metal; it is contemplated that the mechanical pump 22 must be of increased capacity to also drive the primary liquid metal. The intermediate liquid metal passes through the IHX 16 receiving thermal energy from the primary liquid metal as heated by the core 12 and passes via outlet conduit 23 to a steam generator 24.

A vaporizable fluid, such as water, is circulated through the steam generator 24, whereby the water is vaporized, before being circulated about a steam loop 34 to a turbine 26, whereby the impellers of the turbine 26 are rotated to drive an electric generator 28, which in turn outputs electrical energy. The spent vapor leaves the turbine 26 and is condensed by a condenser 30, before returning to the condensate pump 32, to be recirculated through the steam generator 24.

Figure 2:
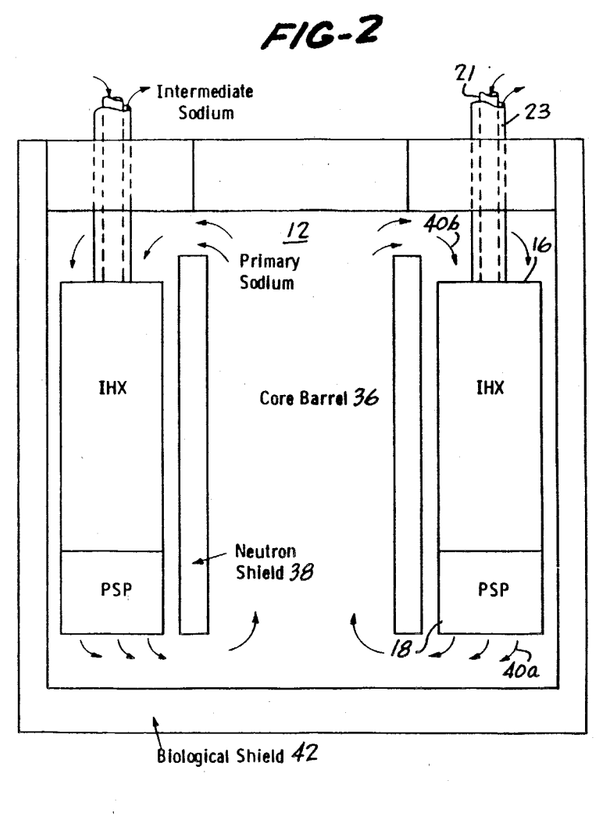
FIGS. 2 and 3 are respectively a simplified, broken away side view and a top, plan view of a pool-type, nuclear liquid metal reactor as shown in FIG. 1.
Figure 3:
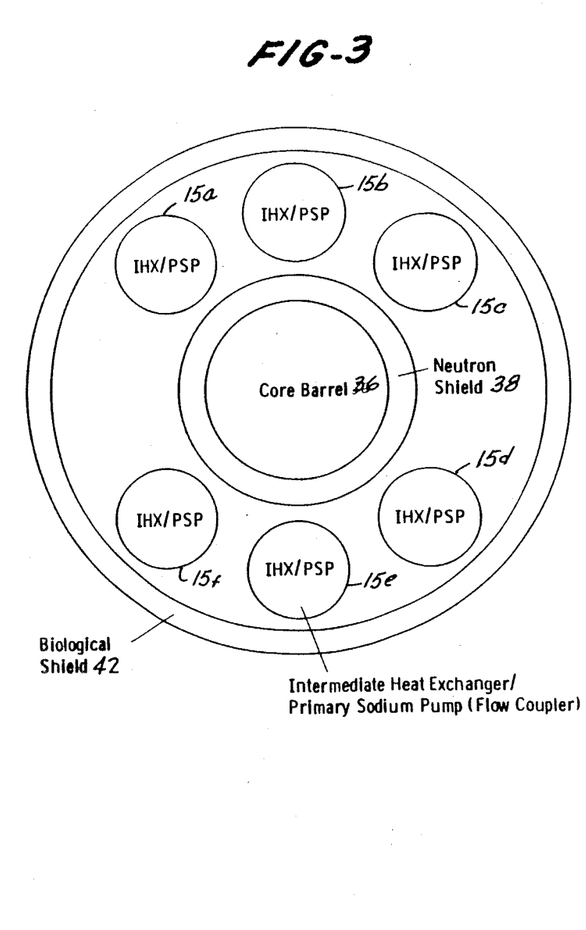

A plurality of the PSP/IHX assemblies 15 is incorporated within the annular region surrounding a reactor core 12 of a pool type reactor, as illustratively shown in FIGS. 2 and 3. Six such PSP/IHX assemblies 15a to 15f are disposed in a circular array about a core barrel 36, as shown in FIG. 3. A biological shield 42 surrounds the core barrel 36. The intermediate liquid metal is directed via inlet conduit 21 to the IHX 16 and discharged therefrom via conduit 23. The primary liquid metal is pumped by the PSPs 18 about a neutron shield 38 as shown by arrows 40a to be heated within the core barrel 36, before being returned as indicated by the arrows 40b to each of the plurality of IHXs 16.

Figure 4:
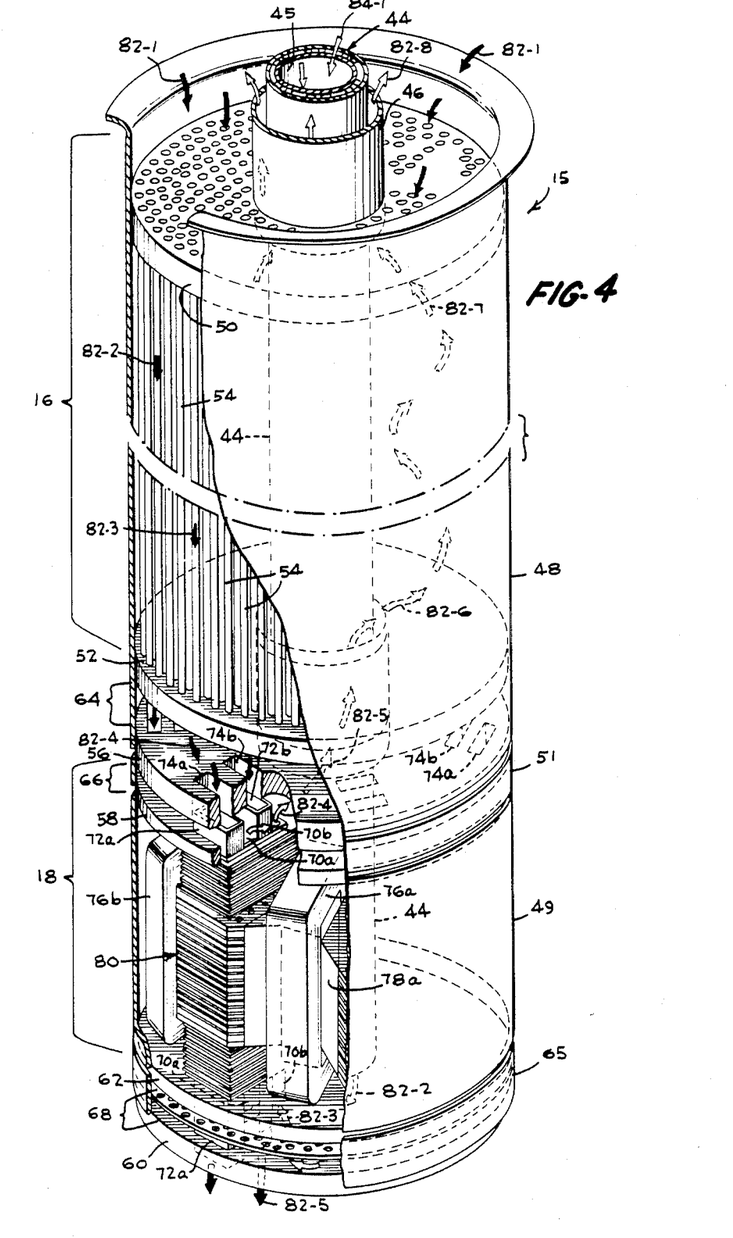
FIG. 4 is a detailed, perspective view of the PSP/heat exchanger assembly as generally shown in each of FIGS. 1, 2 and 3.
Figure 5:
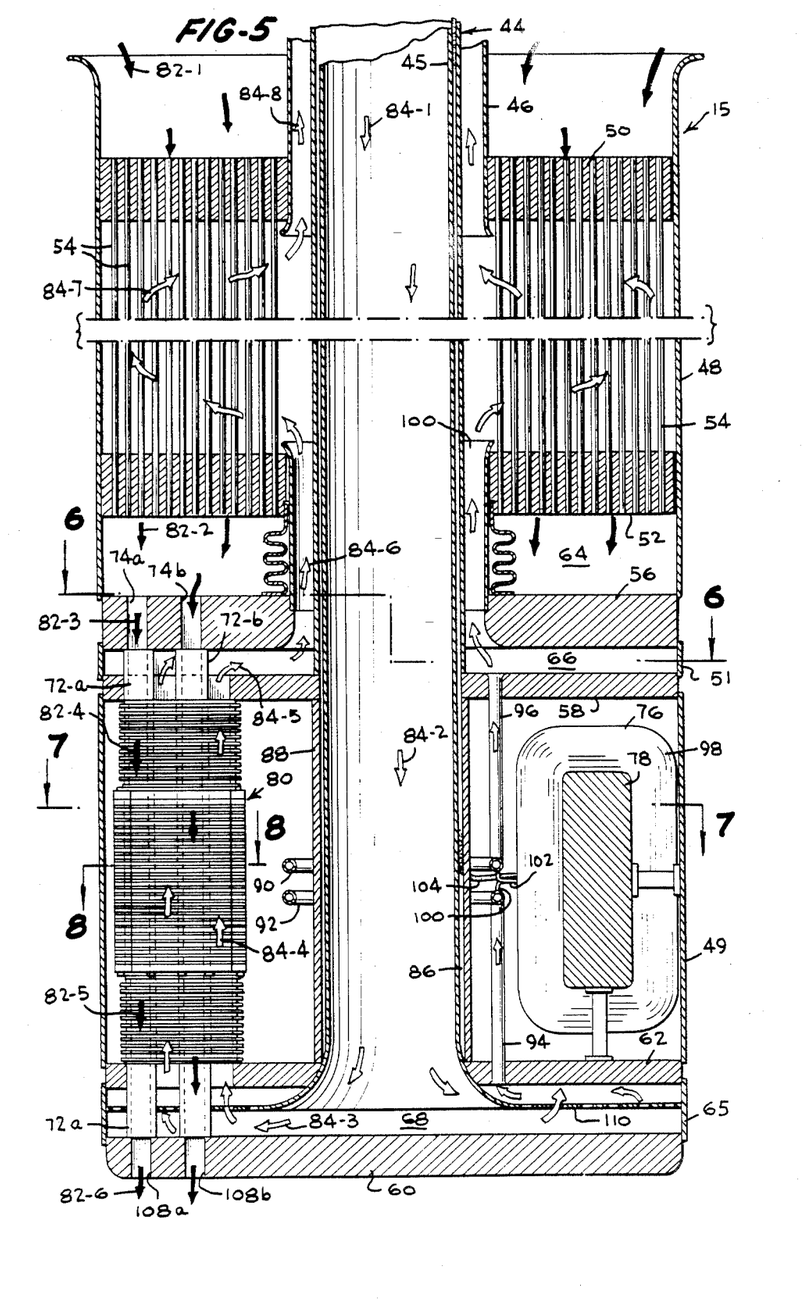
FIG. 5 is a side, sectioned view of the PSP/heat exchanger assembly as shown in FIG. 4.

Additional details of the PSP/IHX assembly 15 are shown in FIGS. 4 and 5. The inlet conduit 21 is coupled to outer and inner downcomer pipes 44 and 45, which extend axially along substantially the entire length of the assembly 15 for introducing the intermediate liquid metal into a flow coupler lower diffuser 68, disposed at the bottom of the assembly 15. The outer downcomer pipe 44 is disposed concentrically about the inner downcomer pipe 45 and forms therewith a downcomer annulus 86. The intermediate liquid metal is directed as indicated by the arrows 84 through the PSP 18 and the IHX 16 to exit via an intermediate outlet conduit 46, which is disposed concentrically about the pipes 44 and 45 and is coupled to the outlet conduit 23 for conveying the intermediate liquid metal in the intermediate loop 20.

The PSP/IHX assembly 15 includes an IHX outer shell 48, which encloses the IHX 16 and supports at its upper end, an upper tube sheet 50 and at its lower end, a lower tube sheet 52. The upper and lower tube sheets 50 and 52 support therebetween an array of tubes 54. The tubes 54 are spaced from each other and disposed in that annular space formed between the IHX outer shell 48 and the outer downcomer pipe 44. As indicated by the arrows 84, the intermediate liquid metal flows about the tubes 54 and through this annular space. The primary liquid metal flows as indicated by the arrows 82 through the tubes 54, exiting from their lower ends into a IHX lower plenum 64. The lower end of the plenum 64 is enclosed by an annularly shaped, outer upper support plate 56. A plurality of sets of plate openings 74a and 74b is disposed about the plate 56, the plate openings 74a and 74b passing through the width of the plate 56 for discharging the primary liquid metal.

The PSP/IHX assembly 15 includes a PSP outer shell 49, which encloses and houses the PSP 18. The PSP outer shell 49 supports at its upper end, an inner, upper support plate 58, which includes a plurality of sets of openings disposed thereabout, for permitting the passage upwardly, therethrough of the intermediate liquid metal as suggested by the arrows 84. An intermediate shell 51 overlaps at its upper and lower edges, the outer upper support plate 56 and the inner, upper support plate 58, respectively. The plates 56 and 58 and the intermediate shell 51 define a flow coupler upper plenum 66 for receiving and directing the intermediate liquid metal as it passes upwardly from the PSP 18 and into an interconnecting, annular passage formed between the outer downcomer pipe 44 and an intermediate conduit 106 disposed concentrically about the pipe 44. Since the upper ends of each of the pump ducts 72a and 72b are supported by the outer, upper support plate 56 and the upper ends of the generator ducts 70a and 70b are supported by the inner, upper support plate 58, the plurality of tubes 54 of the IHX 16 may be disposed in a compact array and evenly spaced from each other, whereby the flow of the primary liquid metal may be increased and the diameter or cross-sectional dimension of the PSP/IHX assembly 15 may be minimized.

The PSP outer shell 49 supports at its lower end an inner lower support plate 62. The outer, lower support plate 60 is spaced below from the plate 62 and forms with a lower shell 65 the flow coupler lower diffuser 68 for receiving from the downcomer pipe 44 the intermediate liquid metal and for redirecting it upward through an open grid 110 through openings within the plate 62 and through the PSP 18 as indicated by the arrows 84. The 50% open grid 110 breaks up any eddies and provides a uniform flow of the intermediate liquid metal entering the PSP 18. The flow coupler lower diffuser 68 is configured and dimensioned for minimum pressure loss.

The PSP/IHX assembly 15 is structurally designed to resist the internal pressures and stresses developed by the flows of the intermediate and primary liquid metals. Under normal operating conditions, the differential pressures between the intermediate ducts 70 and the primary ducts 72 is reduced, because the flows of the liquid metals therein is in opposite directions. Typically, a pressure drop in the intermediate ducts 70 is reflected by a pressure rise in the primary ducts 72. The differential pressure between the ducts 70 and 72 may therefore vary, illustratively, in the range of 97 to 310 KPa. The differential pressure between the primary liquid metal within the IHX lower plenum 64 and the intermediate liquid metal within the flow coupler upper plenum 66 is typically 97 KPa, while the normal pressure difference between the intermediate liquid metal within the flow coupler lower diffuser 68 and the lower extensions of the primary ducts 72a and 72b is in the order of 310 KPa. Under upset conditions, however, it is contemplated that the pressure in the intermediate circuit could rise to 1520 KPa, while pressure in the primary circuit would fall to 0 KPa.

The outer, lower support plate 60 is supported simply by the PSP outer shell 49, while its inner portions are left unsupported. The inner, upper support plate 58 and the inner, lower support plate 62 are supported at their outer peripheries by the PSP outer shell 49 and on their inner peripheries by an inner shell 88. The PSP outer shell 49 and the inner shell 88 are designed to resist the internal pressure, axial weight, and vertical seismic loads imposed by and upon the PSP/IHX assembly 15. The design and configuration of the assembly 15 has been carried out to avoid possible buckling of the shells 48, 50 and 88. Horizontal seismic loads should not pose a problem, since the PSP/IHX assembly 15 resides in a closely toleranced support tube filled with pool sodium as a shock absorber.

Figure 6:
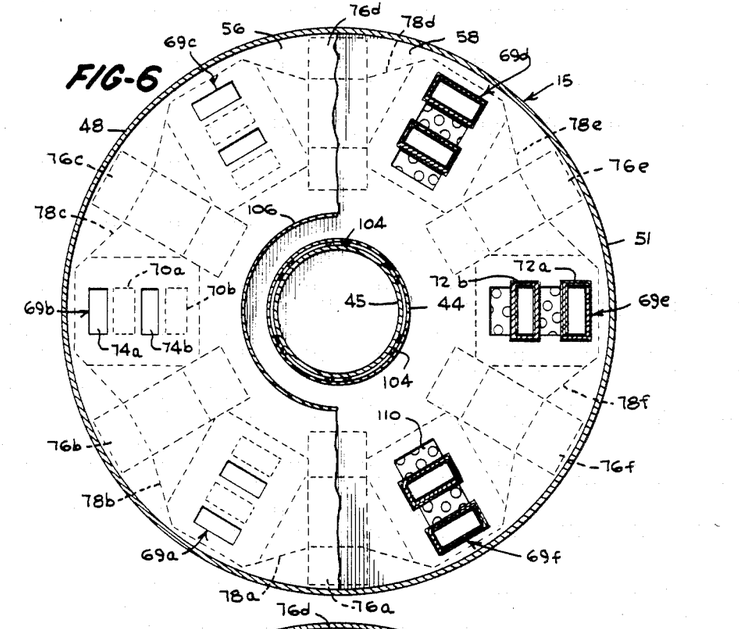
FIGS. 6 and 7 are respectively a plan, sectioned view of the PSP/heat exchanger assembly as taken along line 6—6 of FIG. 5 from above the flow coupler, and a plan, sectioned view through the main or active region of the flow coupler as taken along line 7—7 of FIG. 5.
Figure 7:
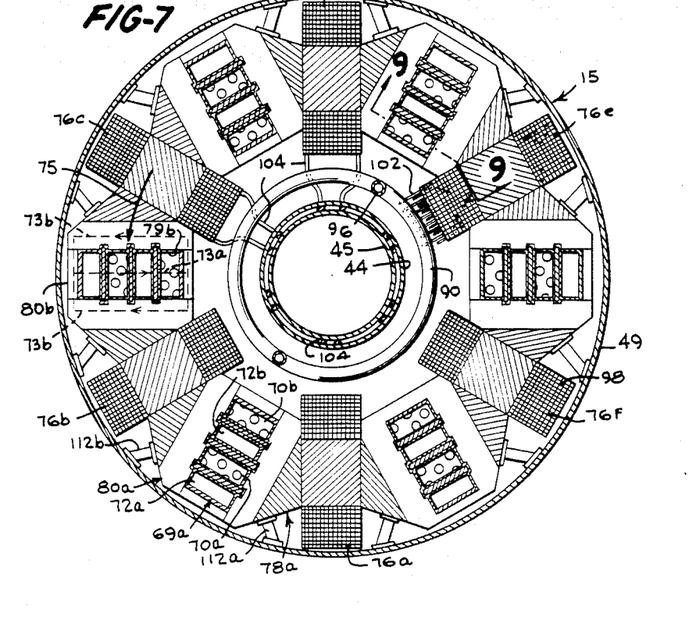

Referring now to FIGS. 6 and 7 in addition to FIGS. 4 and 5, the PSP 18 illustratively comprises a plurality of individual flow couplers in the form of duct modules 69a to 69f. Each duct module 69 comprises a pair of intermediate or generator ducts 70a and 70b, and a second pair of primary or pump ducts 72a and 72b, as shown in FIG. 7. Illustratively, the intermediate ducts 70 are disposed between the primary ducts 72 forming a sequence beginning at the PSP outer shell 49 of a primary duct 72a followed by the intermediate duct 70a, the primary duct 72b and the intermediate 70b. As particularly shown in FIG. 5, the intermediate liquid metal passes as indicated by the arrows 84 upwardly through each pair of intermediate ducts 70a and 70b of each duct module 69 or flow coupler, before being introduced collectively into the flow coupler upper plenum 66. The primary liquid metal as indicated by the arrows 82 downwardly through the plurality of sets of openings 74a and 74b into corresponding primary ducts 72a and 72b, flowing downwardly therethrough to be discharged through a set of outlet openings 108a and 108b, respectively. It is understood that each duct module 69 has its own corresponding set of outlet openings 108a and 108b within the outer, lower support plate 60.

Referring particularly to FIGS. 6 and 7, a toroidally shaped magnetic field is formed by a set of excitation coils 76a to 76f, each excitation coil 76 being disposed between an adjacent pair of duct modules 69. Each excitation coil 76 is disposed about its magnetic pole piece 78, which forms the magnetic field generated by each excitation coil 76 to be directed across that air gap in which one of the duct modules 69 is disposed. The use of plural excitation coils 78 in the PSP 18 is for redundancy. Each coil 78 is separately powered by its own set of coil leads 104 to allow complete control and monitoring of each excitation coil 76. Each pole piece 78 is supported within the IHX outer shell 49 by a pair of support legs 112a and 112b, as shown in FIG. 7. The overall shape of the magnetic field produced by the plurality of excitation coils 76a to 76f and the corresponding plurality of pole pieces 78a to 78f is toroidal. However, each of the pole pieces 78 has a pair of pole faces 79a and 79b disposed at its opposite ends. The pole faces 79a and 79b of a single pole piece 78 are disposed parallel to their respective duct modules 69 so that the magnetic field across a module 69 is uniform. Separate coil leads 104 are introduced into the PSP/IHX assembly 15 via the downcomer annulus 86 to each of the excitation coils 76. Each coil 76, as shown in FIG. 5, has a plurality of hollow turns 98 connected electrically in series with each other.

To maximize the magnetomotive force produced for a given volume of the excitation coils 76, the turns 98 thereof are hollow and are cooled by circulating a small amount of the intermediate sodium therethrough, as illustrated in FIG. 5. A small portion of the intermediate liquid metal forced into the flow coupler lower diffuser 68 is directed up through one of a plurality of inlet conduits 94 in communication with the diffuser 68. The plurality of inlet conduits 94 direct the cooling intermediate liquid metal into an inlet manifold 92 of circular configuration. As shown in FIGS. 5 and 7, a plurality of inlet feeders 100 transmits the cooling, intermediate liquid metal into the turn 98. The cooling, intermediate liquid metal is discharged from the turns 98 through a plurality of outlet feeders 102 into an outlet manifold 90, also of circular configuration. In turn, the intermediate liquid metal is discharged from the outlet manifold 90 upwardly through a plurality of outlet conduits 96 into the flow coupler upper plenum 66. In an illustrative embodiment of this invention, the pressure drop across the turns 98 of the excitation coil 76 is designed to be the same as the pressure drop across the intermediate ducts 70a and 70b. Each excitation coil 76 is illustratively wound with 140 turns 98 of copper conductor of approximately one by one inch square. The turns 98 are hydraulically connected in seven parallel sets of 20 turns 98 each. The complete coil 76 may be wound electrically in a helical fashion with each set of 20 turns 98 winding from the outside of one layer thereof to the inside and there changing to the next layer to return from the inside to the outside of the excitation coil 76. Hence, each of the inlet and outlet feeders 100 and 102 may be connected to the outside of the coil 76.

The PSP 18 includes in the illustrative embodiment shown in FIG. 7, 12 primary ducts 72 and 12 intermediate ducts 70. An adjacent pair of one primary duct 72 and one intermediate duct 70 form a flow coupler. In this illustrative embodiment, there are 12 such flow couplers. A pair of such flow couplers comprised of four ducts 70 and 72 form one of the duct modules 69. Each flow coupler module 69 acts in parallel with each other to transfer at high efficiency the internal energy in the form of a relatively high hydraulic head or pressure of the intermediate sodium as established by the mechanical pump 22 to the primary liquid metal by action of the coupled electric currents and magnetic field. Such coupling is based on the Lorentz relation where the force $\vec{F}$ on a charge $q_o$ moving through a magnetic field $\vec{B}$ with velocity $\vec{V}$ is expressed by the relation:

$$\vec{F} = q_o \vec{V} \times \vec{B}.$$

As this is a vector relationship, the force $\vec{F}$ is maximized when velocity $\vec{V}$ is perpendicular to the magnetic field $\vec{B}$. The excitation coils 76 create a toroidally-shaped magnetic field as indicated by the arrows 75, which passes through each of the flow couplers of each duct module 69. As the magnetic field as indicated by the arrows 75 passes through each of the intermediate ducts 70, the interaction of the intermediate liquid metal pumped upwardly along a line perpendicular to the face of FIG. 7 and the magnetic field directed at right angles to that line, generates an electric potential gradient and causes a current to flow radially inward toward the center of the PSP 18, as indicated by the dotted line 73a. As will be explained, each duct module 69 is formed within a laminate structure 80, which provides a pair of effective return paths 73b about the ducts 70 and 72 before being reintroduced into the primary duct 72a. The current flow within each duct module 69 and its laminate structure 80 is electrically isolated from each other. The interaction between the current flow directed radially inward along the path 73 through the primary or pump ducts 72a and 72b, and the magnetic field directed perpendicular to such current flow as indicated by the arrows 75, imposes a force on the primary liquid metal within the primary ducts 72a and 72b pumping the primary liquid metal downwardly along a line perpendicular into the page of FIG. 7. The intermediate ducts 70 are alternated with the primary ducts 72 to avoid circulating end currents therein. Each of the ducts 70 or 72 is sized individually to be of optimal proportion. The toroidal magnetic field geometry makes optimal use of the space within the PSP outer shell 49, making it possible to keep the outer diameter of the PSP outer shell 49 of approximately the same size as that of the IHX outer shell 48. Further, the toroidal configuration of the magnetic field minimizes the amount of iron within the plurality of the pole pieces 78a to 78f.

Referring now to FIGS. 4 and 5, a brief summary of the hydraulic flows of the intermediate and primary liquid metals will be given. The arrows 84-1 to 84-8 indicate the flow of the intermediate liquid metal through the PSP/IHX assembly 15, starting with arrow 84-1 indicating where the flow of the intermediate liquid metal begins and arrow 84-8 indicating where the intermediate liquid metal exits from the assembly 15. The intermediate liquid metal is received from the inlet conduit 21 of the intermediate loop 20 and is directed downward through the downcomer pipes 44 and 45 and into the flow coupler lower diffuser 68, where the flow of the intermediate liquid metal is reversed, directing the intermediate liquid metal back upward through each set of the intermediate ducts 70a and 70b of each of the duct modules 69. The parallel flows of the intermediate liquid metal through the 6 sets of intermediate ducts 70, is introduced into the flow coupler upper plenum 66, which collects and directs with a minimum loss of pressure the intermediate liquid metal upward through the annulus formed by the conduit 108 and the downcomer pipe 45, and into the IHX 16. The intermediate liquid metal flows upwardly through the IHX 16 circulating about and through the spaces between the tubes 54, before being discharged through the intermediate outlet conduit 46, to be returned by the outlet conduit 23 to the intermediate loop 20.

In a similar fashion, the primary liquid metal is directed through the PSP/IHX assembly 15 along the path and in the sequence as indicated by the arrows 82-1 to 82-6. The heated primary liquid metal is returned from the reactor core 12 and is introduced into the tubes 54 of the IHX 16, giving up its thermal energy to the intermediate liquid metal flowing thereabout. The cooled primary liquid metal exits the tubes 54 into the IHX lower plenum 64. The primary liquid metal continues its downward path through the openings 74a and 74b and into each of a plurality of sets of the primary ducts 72a and 72b flowing downwardly therethrough and being pumped, before being discharged through outlet openings 108a and 108b and returned via the primary loop 14 to the reactor core 12.

The construction of the laminate structure associated with each of the duct modules 69 must satisfy mechanical, electrical and magnetofluidynamic considerations. Often there exists a wide range of pressure conditions in the ducts 70 and 72 ranging from a vacuum condition to a high pressure condition. Often there exists a high differential pressure between the intermediate and primary ducts 70 and 72. High temperatures exist typically not only within the primary ducts 72, but also within the intermediate ducts 70, rising to approximately 320° C. Rapid transient temperature changes in the order of 83° C. may occur at relatively high rates of 0.83° C./second.

Figure 8:
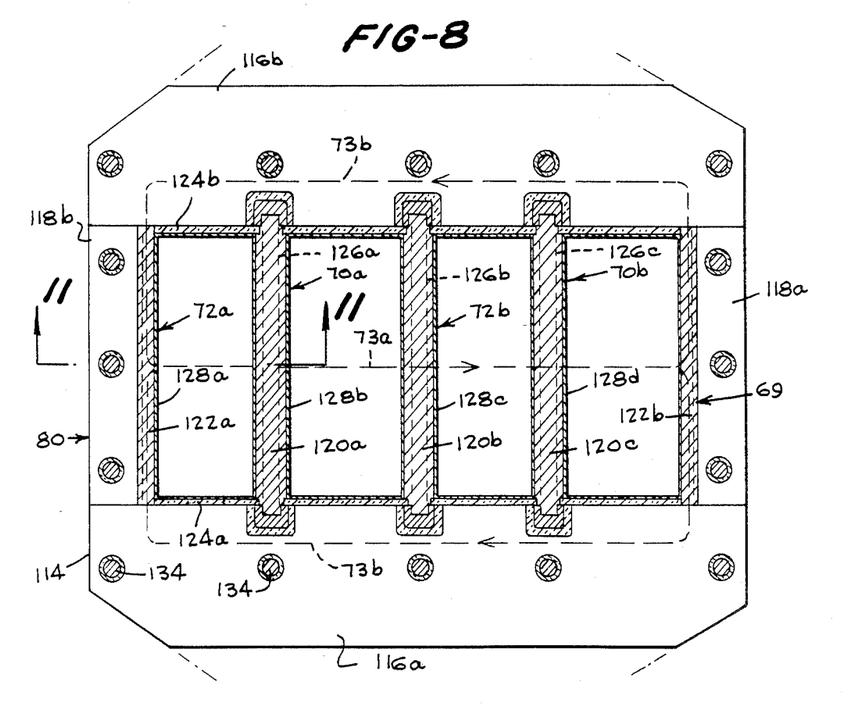
FIG. 8 is a top plan view of a duct module including two intermediate ducts and two primary ducts, as taken along line 8—8 of FIG. 5.
Figure 9:
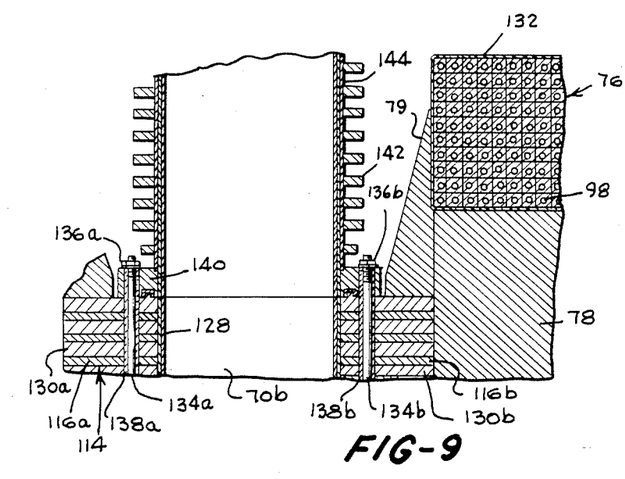
FIG. 9 is a partial side, sectioned view of the duct module and excitation coil, as taken along line 9—9 of FIG. 7 to illustrate an end region of the flow coupler.
Figure 10:
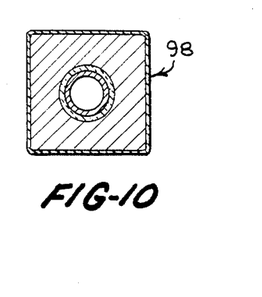
FIG. 10 is a sectioned view of a hollow turn of the excitation coils, as shown in FIG. 9.

Referring now to FIGS. 8 and 9, the details of the construction of the laminate structures 80 and their duct modules 69 will be explained. Adjacent ducts 72 and 70 are separated by center plates 120, which are disposed along the axial length of a duct and serve to separate one duct from another and to serve as an electrode for the passage of current along the radial path 73a, as shown in FIGS. 7 and 8, from primary duct 72a to intermediate duct 70a, from intermediate duct 70a to primary duct 72b, and from primary duct 72b to intermediate duct 70b. At opposite ends of each duct module 69, a pair of electrodes 122a and 122b forms the side wall of the primary duct 72a laying opposite the center plate 120a, and the side wall of the intermediate duct 70b laying opposite the center plate 120c. Typically, the electrodes 122a and 122b and the center plates 120a, 120b, and 120c are made of a highly electrically conductive material such as copper to facilitate the flow of current radially along current path 73a from the electrode 122a, through the primary liquid metal within the primary duct 72a, the center plate 120a, the intermediate liquid metal within the intermediate duct 70a, the center plate 120b, the primary liquid metal within the primary duct 72b, the center plate 120c and the intermediate liquid metal within the intermediate duct 70b, to the electrode 122b.

The current flows through the electrode 122b along the return path 73b to the electrode 122a within the laminate structure 80. The laminate structure 80 as shown in FIGS. 8 and 9 includes a plurality of interleaved composite plate 114 and return conductors 130. As shown in FIG. 8, the composite plate 114 includes a pair of side elements 116a and 116b disposed along the sides of the duct module 69 and made of a magnetic material to facilitate in conjunction with the pole pieces 78, the flow of the magnetic field through the air gap formed by the duct modules 69. The composite plate 114 further includes top and bottom elements 118a and 118b made of a non-magnetic material of increased strength such as a non-magnetic steel to resist internal pressures within the ducts 70 and 72, without "shunting" the magnetic field about the duct modules 69.

Figures 11, 12, 13:
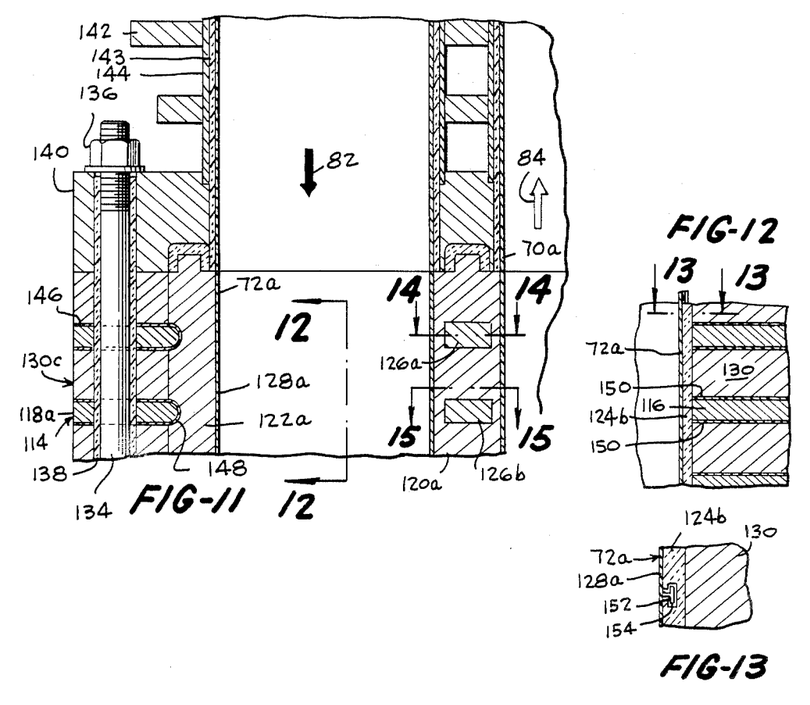
FIG. 11 is a partial, sectioned side view of the duct module, as taken along line 11—11 of FIG. 8.
FIG. 12 is a partial, sectioned side view of the primary duct of the duct module, as taken along line 12—12 of FIG. 11.
FIG. 13 is a partial side, sectioned view of the liner of the intermediate and primary ducts showing the manner of interconnection of the liner to the side walls of the ducts.
Figure 14:
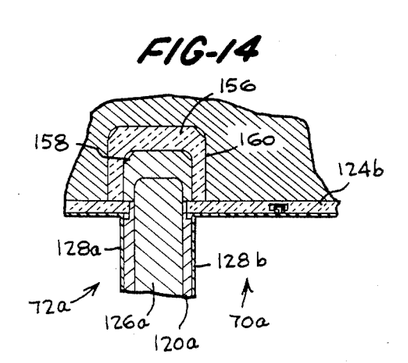
FIGS. 14 and 15 are respectively partial, top plan, sectioned views of the center plates separating the primary and intermediate ducts, as taken along lines 14—14 and 15—15 of FIG. 11.
Figure 15:
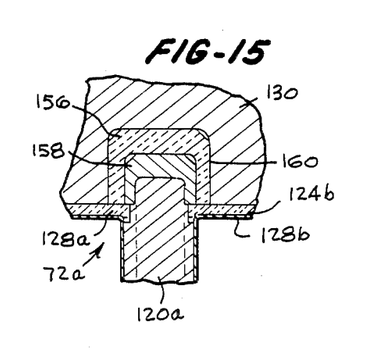

The return conductors 130 may in one illustrative embodiment of this invention, as shown in FIGS. 9 and 11, be an integrally formed, hollow, rectangularly shaped member, having side portions 130a and 130b disposed along the long sides of the duct modules, and a top portion 130c disposed at the top of the duct module as indicated in FIG. 11, it being understood that a bottom element 130d (not shown) would be disposed at the other end of the duct module 69.

As illustrated in FIG. 11, the top elements 118a (as well as the bottom elements 118b, not shown) of the composite plates 114 are imbedded into indentations 148 within the electrode 122a (and the electrode 122b, not shown) and are made of a suitable high strength material such as stainless steel. The insertions of the elements 122 into the electrode indentations 148 increases the resistance and strength of the laminate structure 80 to pressures developed within the ducts 70 and 72. An insulating layer is disposed about each of the top elements 118a to prevent axial current flow in the event of non-uniform potential in these elements.

As shown in FIGS. 8, 9 and 11, the stack of composite plates 114 and return conductors 130 are assembled and maintained together by a plurality of bolts 134 disposed through openings within the composite plates 114 and return conductors 130. An insulating sleeve 138 is disposed about each bolt 134 to electrically isolate the bolt 134 therefrom. The bolts 134 are also disposed through openings within a retaining cap 140 and a nut 136 is threadably secured to the end of the bolt 134 to retain the composite plates 114, the return conductors 130 and the retaining caps 140 together.

The width of the return conductors 130 is illustratively made twice that of the composite plates 114 to make the current return path sufficiently conductive to minimize ohmic losses while still maintaining enough width for an acceptable magnetic flux density in the composite plates 114. The composite plates 114 and the return conductors 130 are laminated along the axis of the ducts 70 and 72 to accommodate thermal expansions of the ducts. The laminating of the return conductors 130 and the composite plates 114 also serves to improve the thermal response of the laminate structure 80 to temperature transients making it respond as an overall thermally thin member.

Referring now particularly to FIGS. 8 and 12, electrical insulation is provided between the radial current path 73a and the return paths 73b by insulation layers 124a and 124b, which are disposed along the long sides of the duct modules 69 extending from the top electrode 122a to the bottom electrode 122b. A liner 120 is disposed within each of the four ducts 72 and 70 to prevent the hot liquid metal from attacking the insulation layers 124. The high pressure normally developed within the ducts 70 and 72 presses the all-welded liners 128a, 128b, 128c and 128d up against the corresponding ducts 72a, 70a, 72b and 70b. Due to the difference in the thermal coefficients of expansion of the insulation layers 124 and the liners 128, it is not possible to bond the liners 128 to the insulation layers 124. To hold the liners 128 within their respective ducts 70 or 72, a plurality of T-shaped retainers 152 are fitted within similarly shaped slots 154 formed within the layers of insulation 124, having their ends extending from the slots 154, connected to their liner 128 as shown in FIG. 13. The spacing between the points of connection of the retainers 152 to its liner 128, is selected to permit the liners 128 to withstand vacuum conditions within the ducts 70 and 72, and a degree of sliding therebetween as the temperature of the duct module 69 rises.

As illustrated in FIGS. 9 and 11, the liners 128 extend beyond the active regions of their ducts 70 and 72, i.e. that region in which the pole pieces 78 and the laminate structures 80 confine the magnetic field as it passes through the ducts 70 and 72. The liners 128 extend upwardly and are supported by a rectangularly shaped shell 144 of a configuration similar to that of its duct 70 or 72. An insulating layer 143 is disposed between the supporting shell 144 and the extended liner 128 to reduce end currents as would otherwise be induced therein. Further, a plurality of spaced, rectangularly shaped plates 142, each having a rectangularly shaped opening of dimensions similar to that of the supporting shell 144, are disposed about the supporting shell 144 to add strength to the ducts 70 and 72 to resist internal pressures.

In the end regions on either side of the active regions, the flux density shaped by the pole pieces 78 is not uniform but, rather, decays almost exponentially as one leaves the active region. The gradient of the flux density is determined by the magnetofluidynamic design and its related magnetic fringing pattern. In the end region, the pole pieces 78 are provided with flared portions 79 to gradually increase the air gap and, thus, reduce the magnetic flux density.

The details of the center plates 120, as generally shown in FIG. 8, are provided in FIGS. 11, 12, 14 and 15. The structure of the center plates 120 ensures that the relatively high pressures within each duct and the high pressure differences between adjacent ducts 70 and 72 will be resisted. The center plates 120 are made of a highly conductive material such as copper to provide a low resistant path for the radially directed current flow 73a. To reinforce such plates 120, a plurality of reinforcing bars 126 is disposed within each plate 120, as shown in FIG. 11. The reinforcing bars 126 are made of a high strength material such as stainless steel. As particularly illustrated in FIGS. 8 and 14, the reinforcing bars 126 are inserted through openings through the insulating layers 124 and into slots 160 formed within the interleaved composite plates 114 and the return conductors 130. To electrically insulate the radial current path 73a from the return current path 73b, a layer 156 of insulating material is disposed between the center plates 120, and the plates 114 and the return conductors 130. Further, an insert 158 of stainless steel is disposed to receive the ends of the reinforcing bars 126 to provide mechanical strength. As particularly shown in FIG. 12, insulating layers 150 are disposed between the side elements 116 of the composite plates 114, and the return conductors 130 to prevent axial current flow between the return conductors 130 in the event of non-uniform potential in these elements.

Since numerous modifications may be made in the above-described apparatus without departing from the spirit and scope of the invention, it is intended that the foregoing description be interpreted as illustrative, and not in a limiting sense.

What is claimed:

1. A heat exchanger and pump assembly for transferring thermal energy from a heated, first electrically conductive fluid to a pump second electrically conductive fluid and for transferring internal energy from said pumped second electrically conductive fluid to said first electrically conductive fluid, said assembly comprising:

(a) a heat exchanger comprising means for defining an annularly shaped cavity for receiving a flow of said second electrically conductive fluid and a plurality of tubes disposed within said cavity, each of said tubes for receiving a flow of said first electrically conductive fluid therethrough, whereby said second electrically conductive fluid in said cavity is heated;

(b) a pump assembly disposed beneath said heat exchanger and comprised of a plurality of flow couplers disposed in a circular array, each flow coupler comprised of a plurality of pump ducts for receiving said first electrically conductive fluid and a plurality of generator ducts for receiving said second electrically conductive fluid, said pluralities of generator and pump ducts disposed in a stack disposed radially with respect to said circular array;

(c) a first conduit disposed centrally of said annularly shaped cavity and within said circular array of said flow couplers for receiving said second electrically conductive fluid, said conduit extending continuously through said annular cavity and said circular array of said flow couplers;

(d) a first plenum chamber disposed beneath said pump assembly, in communication with said centrally disposed first conduit for receiving said second electrically conductive fluid and in communication with each of said generator ducts of said flow couplers for directing said pumped second electrically conductive fluid upwardly through said generator ducts in a first direction;

(e) a second plenum chamber disposed intermediate said heat exchanger and said pump assembly, in communication with each of said generator ducts for collecting said second electrically conductive fluid as discharged from each of said generator ducts and in communication with said annular cavity for directing said collected second electrically conductive fluid thereto;

(f) a third plenum chamber disposed intermediate said heat exchanger and said pump assembly and above said second plenum, in communication with said tubes for receiving said first electrically conductive fluid as discharged therefrom and in communication with said pump ducts for introducing said first electrically conductive fluid therein, whereby said first electrically conductive fluid is directed downwardly through said pump ducts in a second direction opposite to said first direction and the internal energy of said pumped second electrically conductive fluid is transferred to and pumps said first electrically conductive fluid, and (g) a second conduit disposed concentrically about said first conduit and in communication with said second plenum chamber for directing said second electrically conductive fluid about said third plenum chamber and into said annular cavity.

2. The heat exchanger and pump assembly as claimed in claim 1, wherein there is further included a plurality of excitation coils, each of said excitation coils disposed intermediate adjacent ones of said flow couplers and actuable for generating in concert with each other a toroidal magnetic field passing through each of said generator and pump ducts.

3. The heat exchanger and pump assembly as claimed in claim 2, wherein there is further included separate electrical leads for each of said excitation coils, whereby the magnetic field generated by each of said excitation coils may be selectively controlled.

4. The heat exchanger and pump assembly as claimed in claim 2, wherein there is further included a plurality of pole pieces, each pole piece associated with a corresponding one of said plurality of excitation coils for forming the magnetic flux generated thereby into said toroidal magnetic field.

5. The heat exchanger and pump as claimed in claim 2, wherein each of said plurality of excitation coils is wound of a plurality of turns, each of said turns being hollow.

6. The heat exchanger and pump assembly as claimed in claim 1, wherein there is further included means for defining a passage from said second plenum chamber to said annular cavity.

7. The heat exchanger and pump assembly as claimed in claim 6, wherein there is included means in communication with said annular cavity for discharging said heated second electrically conducted material therefrom.

8. The heat exchanger and pump assembly as claimed in claim 1, wherein said pump assembly comprises a first plate disposed at the bottom thereof, a first annularly shaped plate disposed above said first plate and forming therewith said first plenum chamber, a second annularly shaped plate disposed above said first annularly shaped plate and supporting therebetween said plurality of flow couplers, and a shell disposed about said pump assembly for supporting at its upper end said first annularly shaped plate and at its lower end said second annularly shaped plate.

9. The heat exchanger and pump assembly as claimed in claim 8, wherein there is further included a third annularly shaped plate, a fourth annularly shaped plate disposed beneath said third annularly shaped plate for supporting said plurality of tubes therebetween, a fifth annularly shaped plate disposed beneath said fourth annularly shaped plate and defining therebetween said third plenum chamber, and a second shell disposed about said heat exchanger and supporting at its upper end said third annularly shaped plate at its lower end said fourth and fifth annularly shaped plates.

10. The heat exchanger and pump as claimed in claim 9, wherein said second and fifth annularly shaped plates are spaced from each other and define therebetween said second plenum chamber.

11. The heat exchanger and pump assembly as claimed in claim 9, wherein each of said first and second shells has a diameter of approximately the same dimension.

12. A heat exchanger and pump assembly for transferring thermal energy from a heated, first electrically conductive fluid to a pumped second electrically conductive fluid and for transferring internal energy from said pumped second electrically conductive fluid to said first electrically conductive fluid, said assembly comprising:

(a) a heat exchanger comprising means for defining an annularly shaped cavity for receiving a flow of said second electrically conductive fluid and a plurality of tubes disposed within said cavity, each of said tubes for receiving a flow of said first electrically conductive fluid therethrough, whereby said second electrically conductive fluid in said cavity is heated;

(b) a pump assembly disposed beneath said heat exchanger and comprised of a plurality of flow couplers disposed in a circular array, each flow coupler comprised of a pump duct for receiving said first electrically conductive fluid and a generator duct for receiving said second electrically conductive fluid;

(c) a conduit disposed centrally of said annularly shaped cavity and within said array of said flow couplers for receiving said second electrically conductive fluid;

(d) a first plenum chamber disposed beneath said pump assembly, in communication with said centrally disposed conduit for receiving said second electrically conductive fluid and in communication with each of said generator ducts of said flow couplers for directing said pumped second electrically conductive fluid upwardly through said generator ducts;

(e) a second plenum chamber disposed intermediate said heat exchanger and said pump assembly, in communication with each of said generator ducts for collecting said second electrically conductive fluid as discharged from each of said generator ducts and in communication with said annular cavity for directing said collected second electrically conductive fluid thereto;

(f) a third plenum chamber disposed intermediate said heat exchanger and said pump assembly, in communication with said tubes for receiving said first electrically conductive fluid as discharged therefrom and in communication with said pump ducts for introducing said first electrically conductive fluid therein, whereby the internal energy of said pumped second electrically conductive fluid is transferred to and pumps said first electrically conductive fluid; and (g) a plurality of excitation coils, each of said excitation coils disposed intermediate adjacent ones of said flow couplers and actuable for generating in concert with each other a toroidal magnetic field passing through each of said generator and pump ducts, separate electrical leads for each of said excitation coils, whereby the magnetic field generated by each of said excitation coils may be selectively controlled;

(h) said conduit comprises first and second pipes disposed concentrically about each other and forming an annular passage therebetween for receiving said electrical leads.

13. A heat exchanger and pump assembly for transferring thermal energy from a heated, first electrically conductive fluid to a pumped second electrically conductive fluid and for transferring internal energy from said pumped second electrically conductive fluid to said first electrically conductive fluid, said assembly comprising:

(a) a heat exchanger comprising means for defining an annularly shaped cavity for receiving a flow of said second electrically conductive fluid and a plurality of tubes disposed within said cavity, each of said tubes for receiving a flow of said first electrically conductive fluid therethrough, whereby said second electrically conductive fluid in said cavity is heated;

(b) a pump assembly disposed beneath said heat exchanger and comprised of a plurality of flow couplers diposed in a circular array, each flow coupler comprised of a pump duct for receiving said first electrically conductive fluid and a generator duct for receiving said second electrically conductive fluid;

(c) a conduit disposed centrally of said annularly shaped cavity and within said array of said flow couplers for receiving said second electrically conductive fluid;

(d) a first plenum chamber disposed beneath said pump assembly, in communication with said centrally disposed conduit for receiving said second electrically conductive fluid and in communication with each of said generator ducts of said flow couplers for directing said pumped second electrically conductive fluid upwardly through said generator ducts;

(e) a second plenum chamber disposed intermediate said heat exchanger and said pump assembly, in communication with each of said generator ducts for collecting said second electrically conductive fluid as discharged from each of said generator ducts and in communication with said annular cavity for directing said collected second electrically conductive fluid thereto;

(f) a third plenum chamber disposed intermediate said heat exchanger and said pump assembly, in communication with said tubes for receiving said first electrically conductive fluid as discharged therefrom and in communication with said pump ducts for introducing said first electrically conductive fluid therein, whereby the internal energy of said pumped second electrically conductive fluid is transferred to and pumps said first electrically conductive fluid;

(g) a plurality of excitation coils, each of said excitation coils disposed intermediate adjacent ones of said flow couplers and actuable for generating in concert with each other a toroidal magnetic field passing through each of said generator and pump ducts, each of said plurality of excitation coils is wound of a plurality of turns, each of said coils being hollow; and (h) means for introducing said second electrically conductive fluid into each of said hollow coils, whereby said excitation coils are cooled.

14. The heat exchanger and pump assembly as claimed in claim 13, wherein said introducing means comprises a manifold, at least one conduit in communication with said first plenum chamber and said manifold for introducing said second electrically conductive fluid into said manifold, and a plurality of input feeder means, each associated with said manifold and one of said excitation coils for introducing said second electrically conductive fluid into said turns of said one excitation coil.

15. The heat exchanger and assembly as claimed in claim 14, wherein said introducing means further comprises a second manifold, at least one second conduit in communication with said second plenum chamber and said second manifold, and a set of second feeder means, each associated with said second manifold and one of said excitation coils for receiving said second electrically conductive fluid as discharged from said one excitation coil and for delivering said discharged second electrically conductive fluid via said second manifold and said second conduit to said second plenum chamber.

* * * * *